United States Patent
Hsieh et al.

(10) Patent No.: US 8,387,133 B2
(45) Date of Patent: Feb. 26, 2013

(54) POWER ON CERTIFICATION METHOD FOR PERSONAL COMPUTER AND POWER ON CERTIFICATION SYSTEM THEREOF

(75) Inventors: Ming-Chung Hsieh, Taipei County (TW); Heng-Yung Su, Taipei County (TW)

(73) Assignee: MSI Computer (Shenzhen) Co., Ltd., Shenzhen, Guangdong Province (CN)

( * ) Notice: Subject to any disclaimer, the term of this patent is extended or adjusted under 35 U.S.C. 154(b) by 523 days.

(21) Appl. No.: 12/702,958

(22) Filed: Feb. 9, 2010

(65) Prior Publication Data

US 2011/0060899 A1     Mar. 10, 2011

(30) Foreign Application Priority Data

Sep. 9, 2009   (TW) .............................. 98130450 A

(51) Int. Cl.
    *G06F 7/04*          (2006.01)
(52) U.S. Cl. ................ 726/17; 726/20; 726/27; 726/36
(58) Field of Classification Search ........................ None
See application file for complete search history.

(56) References Cited

U.S. PATENT DOCUMENTS

| | | | | |
|---|---|---|---|---|
| 5,887,131 A | * | 3/1999 | Angelo | 726/20 |
| 6,185,678 B1 | * | 2/2001 | Arbaugh et al. | 713/2 |
| 6,735,696 B1 | * | 5/2004 | Hannah | 713/189 |
| 7,343,498 B2 | * | 3/2008 | Morrow | 713/300 |
| 2005/0154930 A1 | * | 7/2005 | Morrow | 713/300 |
| 2009/0182995 A1 | * | 7/2009 | Muir | 713/1 |

FOREIGN PATENT DOCUMENTS

CN          101105753 A     1/2008

* cited by examiner

*Primary Examiner* — Kaveh Abrishamkar
(74) *Attorney, Agent, or Firm* — Morris Manning & Martin LLP; Tim Tingkang Xia, Esq.

(57) ABSTRACT

A power on certification method for a personal computer (PC) and a power on certification system thereof are described. The power on method includes the following steps. At least one booting certification device is connected to a PC. The PC is booted, and a basic input output system (BIOS) is run. The BIOS is made to retrieve recognition information of the booting certification device through a verification procedure, so as to judge whether the recognition information is consistent with verification information stored in the PC. After the booting certification device passes through the verification procedure, the PC completes other procedures in the BIOS, and enters an operating system.

8 Claims, 15 Drawing Sheets

POWER ON CERTIFICATION METHOD FOR PERSONAL COMPUTER AND POWER ON CERTIFICATION SYSTEM THEREOF

CROSS-REFERENCE TO RELATED APPLICATIONS

This non-provisional application claims priority under 35 U.S.C. §119(a) on Patent Application No(s). 098130450 filed in Taiwan, R.O.C. on Sep. 9, 2009, the entire contents of which are hereby incorporated by reference.

BACKGROUND OF THE INVENTION

1. Field of the Invention

The present invention relates to a certification method and a certification system, and more particularly to a power on certification method for a personal computer (PC) and a power on certification system thereof.

2. Related Art

Along with the rapid development of PCs, more and more people use the PCs for assisting works. In order to ensure the security of data in the PC, a plurality of confidentiality manners is provided in the PC.

The most common confidentiality manner is a verification password function in a basic input output system (BIOS) of the PC. The BIOS is the first executed procedure in a PC running process. Once the verification password function of the BIOS is started, the PC inquires of the user about the password when the BIOS is run. If the user inputs the false password, the BIOS is not continuously run, until the user inputs the correct password.

In the prior art, the BIOS is stored in a flash memory in a main board. Option data (comprising the verification password) of the BIOS is stored in a complementary metal-oxide-semiconductor (CMOS) memory. The CMOS memory is a volatile memory, such that an electric power for the operation of the CMOS memory needs to be provided by a battery of the main board. Once the electric power is interrupted, the data in the CMOS memory is lost. In other words, the verification password is also lost.

Alternatively, when the user updates the BIOS, the flash memory and the CMOS memory may be damaged due to irresistible reasons, thus causing the loss of the verification password.

In Chinese Patent Publication No. CN101105753A, entitled "Computer Security Control Method Based on USB Flash Disk", in the prior art, when the operation system is started, a universal serial bus (USB) flash disk may be used as a manner of verifying the user. When a pop-up user password verification window is displayed in the operating system, the user only needs to insert the USB flash disk into the PC. The PC retrieves the password information in the USB flash disk, and judges whether the group of the password is correct or not. The user needs not to input the password, thus the risk that the password is recorded is lowered. For example, the malicious user may add a new disk, and performs the power on action by using the added disk. In this manner, the user may avoid the test procedure of the operating system.

However, the prior art is limited to only protect the operating system when the operating system is run, but it is impossible to ensure whether the BIOS is changed or not, such that the using security of the PC has loopholes.

SUMMARY OF THE INVENTION

In view of the above problems, the present invention is a certification method applied to a power on certification system for a PC, capable of performing corresponding verification procedures on different booting certification devices.

The present invention provides a certification method applied to a power on certification system for a PC, which comprises the following steps. A booting certification device is connected to a PC. The PC is booted. A verification procedure of the PC retrieves recognition information of the booting certification device, so as to judge whether the booting certification device satisfies the verification information or not. When the booting certification device satisfies the verification information, the PC continuously runs other procedures in a BIOS.

The present invention is a power on certification system for a PC. When a PC is powered on, a verification procedure during a power-on stage is performed by using a booting certification device.

The present invention provides a power on certification system for a PC, which comprises at least one booting certification device and a PC. The booting certification device has a connection interface and recognition information. The PC comprises a connection port, a verification procedure, at least one piece of verification information, and a plurality of peripheral devices. The PC is electrically connected to the booting certification device through the connection port. When the PC runs the verification procedure while running a power on self test (POST) procedure, the verification procedure retrieves the recognition information and judges whether the recognition information is consistent with certification information. If the recognition information is different from the certification information, the PC runs the verification procedure again.

The present invention is a certification information setting method applied to a power on certification system for a PC.

The present invention provides a certification information setting method applied to a power on certification system for a PC, which comprises the following steps. A booting certification device is connected to a PC. A BIOS of the PC is run. A verification information generation procedure of the BIOS is enabled. Certification information is retrieved from the booting certification device, and is stored in the BIOS.

In the power on certification method for the PC and the power on certification system thereof provided in the present invention, the certification device is connected to the PC, and the PC performs the verification procedure during a power-on stage according to the certification information of the certification device. Users need not to input passwords, and a security of the BIOS is ensured. Further, the peripheral devices capable of being used by each user may be determined.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
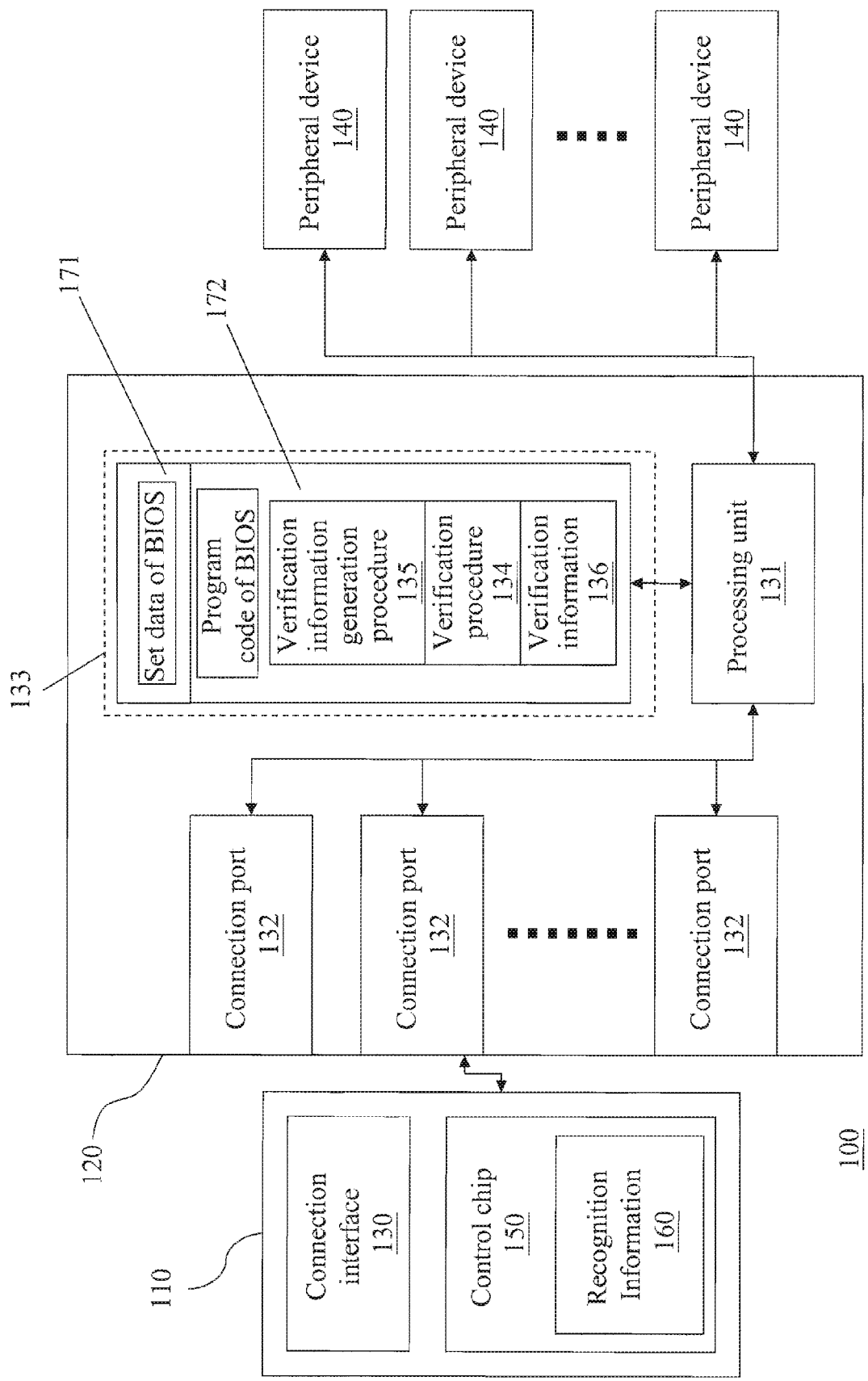
FIG. 1 is a schematic block diagram of a circuit according to the present invention.

FIG. 1 is a schematic block diagram of a circuit according to the present invention. Referring to FIG. 1, a power on certification system 100 for a PC according to the present invention comprises at least one booting certification device 110 and a PC 120. The booting certification device 110 is electrically connected to the PC 120. The booting certification device 110 comprises a connection interface 130, a control chip 150, and recognition information 160. The connection interface 130 in this embodiment is, for example, a USB. In addition, the booting certification device 110 may also be a USB disk, a USB blue tooth transmitter, a USB card reader, or a device having the USB control chip 150. A unique delivery number is set on the control chip 150 of the booting certification device 110 before delivery, and the corresponding recognition information 160 is generated according to the delivery number (a generation manner may be obtained with reference to the description given hereafter).

The PC 120 comprises a processing unit 131, at least one group of connection ports 132 corresponding to the connection interface 130, a BIOS 133, a verification procedure 134, a verification information generation procedure 135, verification information 136, and a plurality of peripheral devices 140. A type of the connection ports 132 is corresponding to the connection interface 130 of the booting certification device 110. Accordingly, the connection ports 132 of the PC 120 are USB.

In the present invention, set data of the BIOS 133 and program codes of the BIOS 133 are respectively stored in a CMOS 171 and another flash read only memory (ROM) 172. When beginning to run, the PC 120 firstly runs program codes relevant to initialization of the memory of the BIOS 133 in the flash ROM 172, and begins a configuration of initializing the memory (not shown). After finishing initializing of the memory, other program codes of the BIOS 133 in the flash ROM 172 are decompressed in the memory for being stored. The PC 120 begins to run the BIOS 133 in the memory.

Figure 2:
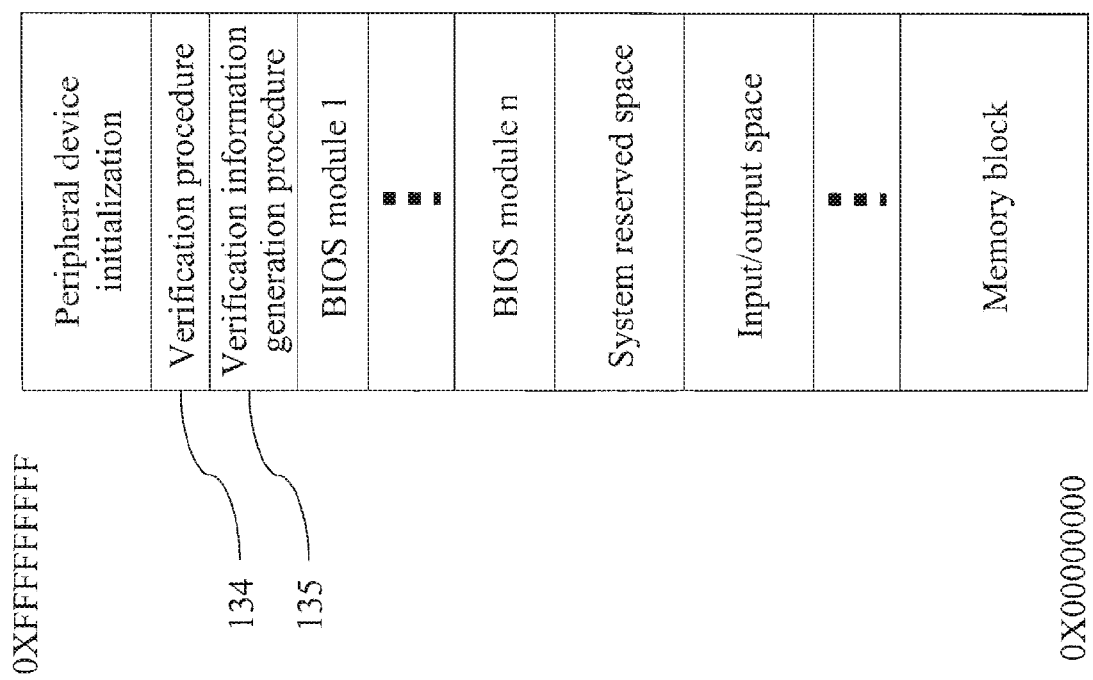
FIG. 2 is a schematic architectural view of a BIOS in a memory according to the present invention.

Next, the BIOS 133 reads the set data stored in the CMOS 171, and initializes other hardware devices according to the set data. The set data is, for example, a bootstrap, a memory distribution, an input/output of a south/north bridge chipset etc. FIG. 2 is a schematic architectural view of the BIOS in the memory according to the present invention. Referring to FIG. 2, generally, the executing the BIOS 133 comprises executing corresponding procedures one by one from top to bottom of FIG. 2 (from a high memory segment to a low memory segment).

In the present invention, after each device is initialized, the setting and the certification processes of the verification information 136 according to the present invention are run. The various settings and the certification processes of the verification information 136 are described in the following.

First Embodiment

Figure 3A:
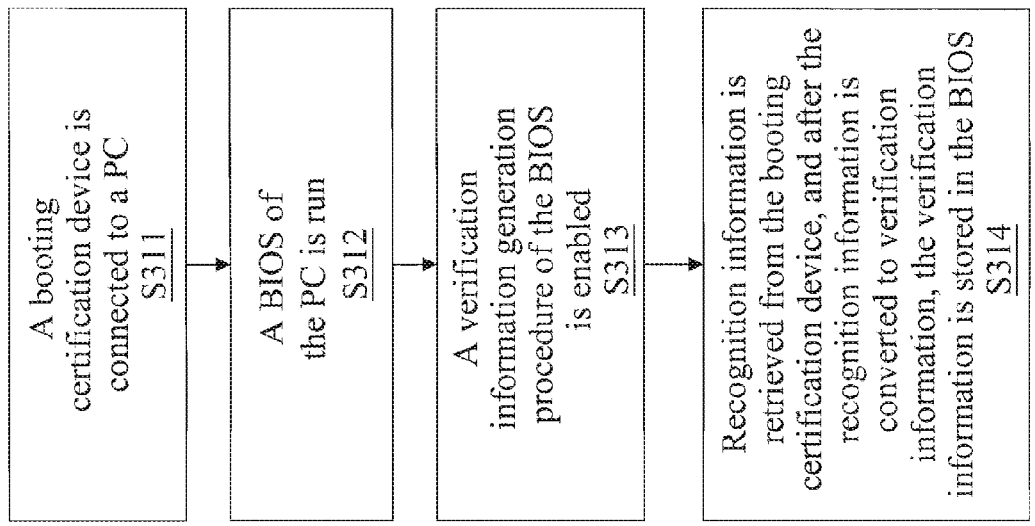
FIG. 3A is a schematic flow chart of a process of setting verification information according to a first embodiment of the present invention.

In the first embodiment, a single booting certification device 110 and a single connection port 132 are set as an example. In order to clearly illustrate an entire operating process of the present invention, please refer to FIG. 3A, it is a schematic flow chart of a process of setting the verification information according to the present invention. The setting of the verification information 136 according to the present invention comprises the following steps.

In Step S311, the booting certification device is connected to a PC.

In Step S312, a BIOS of the PC is run.

In Step S313, a verification information generation procedure of the BIOS is enabled.

In Step S314, recognition information is retrieved from the booting certification device, and after the recognition information is converted to verification information, the verification information is stored in the BIOS.

Firstly, the booting certification device 110 is connected to the PC 120 before the PC 120 runs a BIOS 133. A power supply of the PC 120 is turned on, such that the PC 120 begins to run the BIOS 133 (corresponding to Step 311-Step S312). Here, a user enters the BIOS 133, and enables options enabled by the verification information generation procedure 135 (corresponding to Step 313). The PC 120 detects whether the booting certification device 110 is connected to the PC 120 or not. If the PC 120 detects that the booting certification device 110 is connected, the PC 120 retrieves the recognition information 160 from the booting certification device 110, and stores the recognition information 160 as the verification information 136 (corresponding to Step 314). The recognition information 160 here is the above-described "unique delivery number set on the control chip 150 before delivery". Definitely, the delivery number may be stored as the verification information 136 after an encryption or a pseudo random process.

Figure 3B:
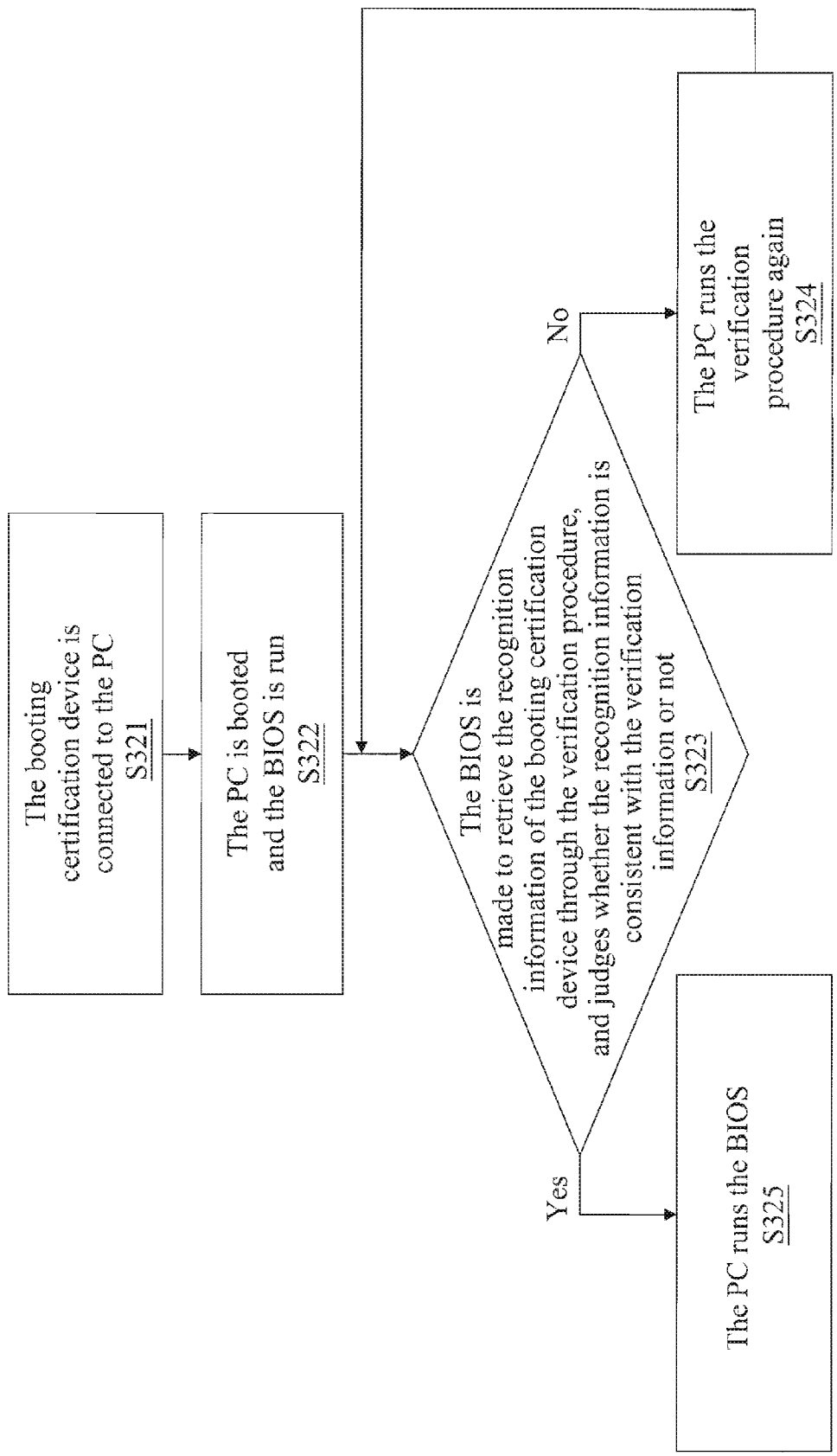
FIG. 3B is a schematic flow chart of a process of operating certification according to the first embodiment of the present invention.

After completing setting the verification information 136, the PC 120 runs the verification procedure 134 during a power-on stage later. FIG. 3B is a schematic flow chart of a process of operating the certification according to the present invention. Referring to FIG. 3B, the process comprises the following steps.

In Step S321, the booting certification device is connected to the PC.

In Step S322, the PC is booted and the BIOS is run.

In Step S323, the BIOS is made to retrieve the recognition information of the booting certification device through the verification procedure, and judges whether the recognition information is consistent with the verification information or not.

In Step S324, when the recognition information is different from the verification information, the PC runs the verification procedure again.

In Step S325, when the recognition information is consistent with the verification information, the PC runs the BIOS.

Any one booting certification device 110 is selected and connected to the PC 120 (corresponding to Step S321). The booting certification device 110 is connected to the PC 120 before the PC 120 is operated, and then the power supply of the PC 120 is turned on (corresponding to Step S322), such that the PC 120 begins to run the BIOS 133 and the verification procedure 134. The verification procedure 134 firstly detects whether the booting certification device 110 is connected to the PC 120 or not. When it is determined that the booting certification device is connected to the PC 120, the verification procedure 134 retrieves certification information to be detected from the booting certification device 110 (corresponding to Step S323).

When the recognition information 160 is different from the verification information 136, the processing unit 131 continuously runs the verification procedure 134, until the user connects the correct booting certification device 110 to the PC 120 (corresponding to Step S324). When the recognition information 160 is consistent with the verification information 136, the processing unit 131 continuously runs the remaining initialization actions of the BIOS 133, and begins to run a corresponding operating system (corresponding to Step S325).

Second Embodiment

Figure 4A:
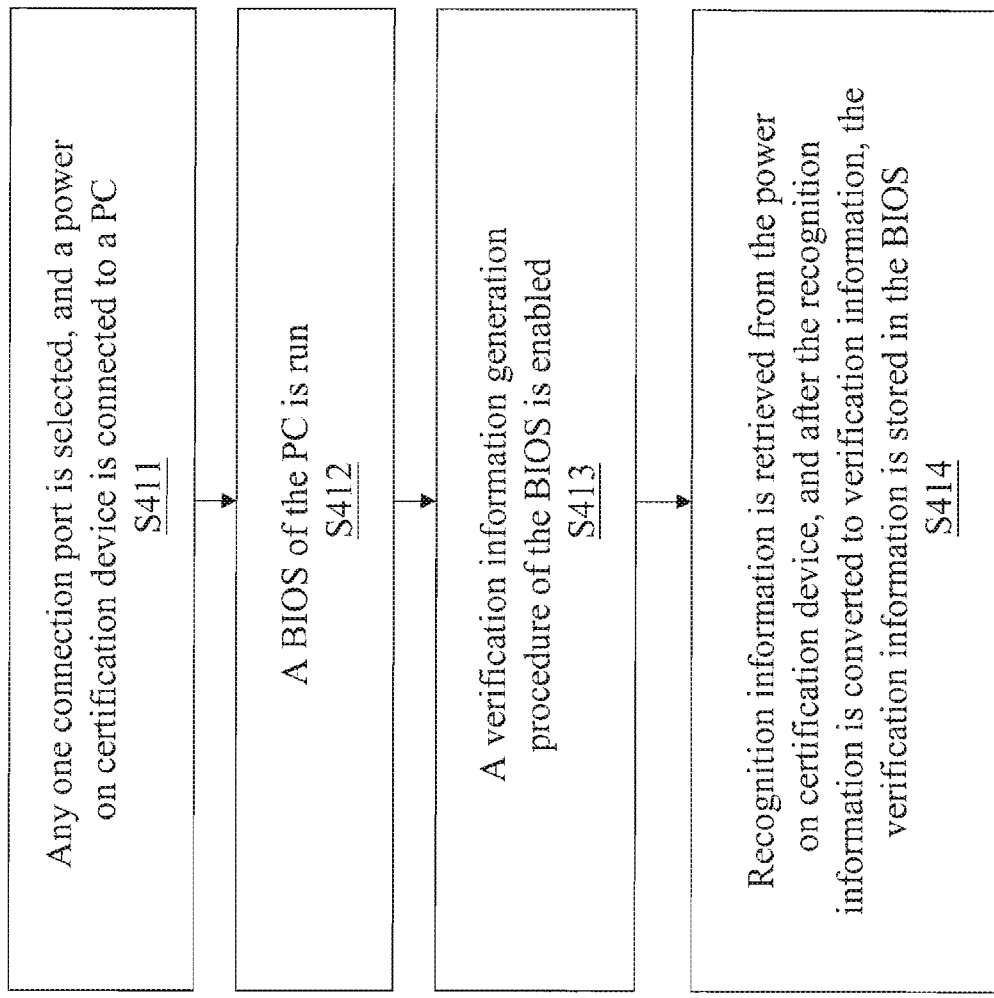
FIG. 4A is a schematic flow chart of a process of setting verification information according to a second embodiment of the present invention.

In the second embodiment, a single booting certification device 110 and a plurality of connection ports 132 are set as an example. FIG. 4A is a schematic flow chart of a process of setting the verification information according to the present invention. Referring to FIG. 4A, the process of setting the verification information 136 according the present invention comprises the following steps.

In Step S411, any one connection port is selected, and the booting certification device is connected to a PC.

In Step S412, a BIOS of the PC is run.

In Step S413, a verification information generation procedure of the BIOS is enabled.

In Step S414, recognition information is retrieved from the booting certification device, and after the recognition information is converted to verification information, the verification information is stored in the BIOS.

Firstly, one connection port is selected from the plurality of connection ports 132, and the booting certification device 110 is electrically connected to the connection port 132 (corresponding to Step S411). After Step S411 is finished, the PC 120 begins to operate. The processing unit 131 runs the BIOS 133 (corresponding to Step S412) at the beginning of the power-on stage. After entering the BIOS 133, the processing unit 131 starts the verification information generation procedure 135, the processing unit 131 retrieves the recognition information 160 from the booting certification device 110, and stores the recognition information 160 in the BIOS 133 (corresponding to Step S413-Step S414).

Figure 4B:
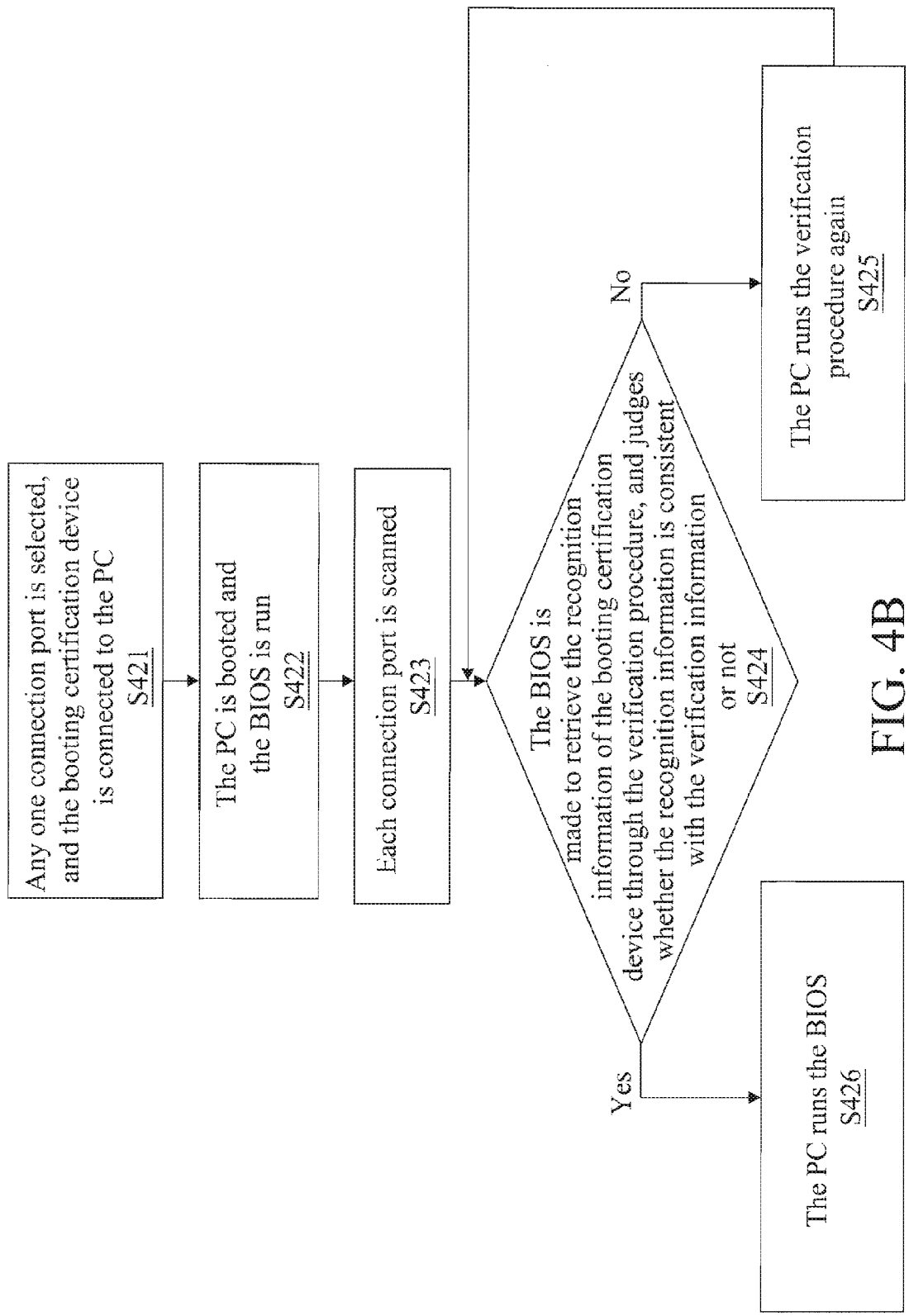
FIG. 4B is a schematic flow chart of a process of setting certification information according to the second embodiment of the present invention.

After completing setting the verification information 136, the PC 120 runs the verification procedure 134 during the power-on stage later. FIG. 4B is a schematic flow chart of a process of operating the certification according to the second embodiment of the present invention. Referring to FIG. 4B, the process comprises the following steps.

In Step S421, any one connection port is selected, and the booting certification device is connected to the PC.

In Step S422, the PC is booted and the BIOS is run.

In Step S423, each connection port is scanned.

In Step S424, the BIOS is made to retrieve the recognition information of the booting certification device through the verification procedure, and judges whether the recognition information is consistent with the verification information or not.

In Step S425, when the recognition information is different from the verification information, the PC runs the verification procedure again.

In Step S426, when the recognition information is consistent with the verification information, the PC runs the BIOS.

Being different from the first embodiment, in the second embodiment, the PC 120 has a plurality of connection ports 132, and one connection port is selected from the connection ports 132 (corresponding to Step S421). After the user connects the booting certification device 110 to the PC 120, the processing unit 131 is started and the BIOS 133 is run (corresponding to Step S422). During running, the BIOS 133 may call the verification procedure 134, and the verification procedure 134 firstly scans whether each connection port 132 is connected to the booting certification device 110 or not. If the connection port 132 is connected to the booting certification device 110, the verification procedure 134 retrieves the recognition information 160 of the booting certification device 110, and judges whether the recognition information 160 is consistent with the verification information 136 or not (corresponding to Step S423). When the recognition information 160 of the booting certification device 110 is different from the verification information 136 in the BIOS 133, the processing unit 131 runs the verification procedure 134 again, until the correct booting certification device 110 is connected to the PC 120 (corresponding to Step S424). When the recognition information 160 of the booting certification device 110 is consistent with the verification information 136 in the BIOS 133, the processing unit 131 continuously runs other procedures in the BIOS 133 (corresponding to Step S425).

Third Embodiment

Figure 5A:
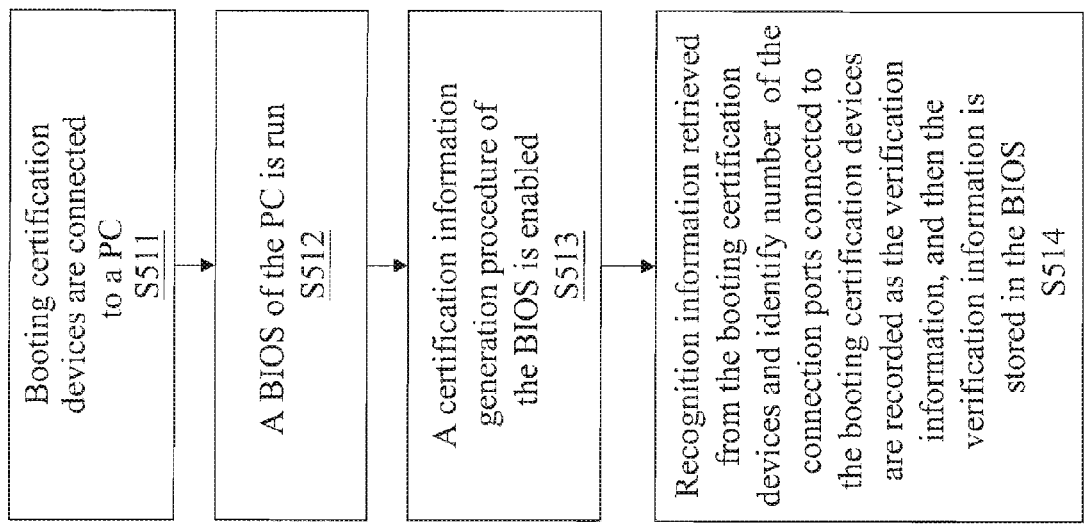
FIG. 5A is a schematic flow chart of a process of setting verification information according to a third embodiment of the present invention.
Figure 5B:
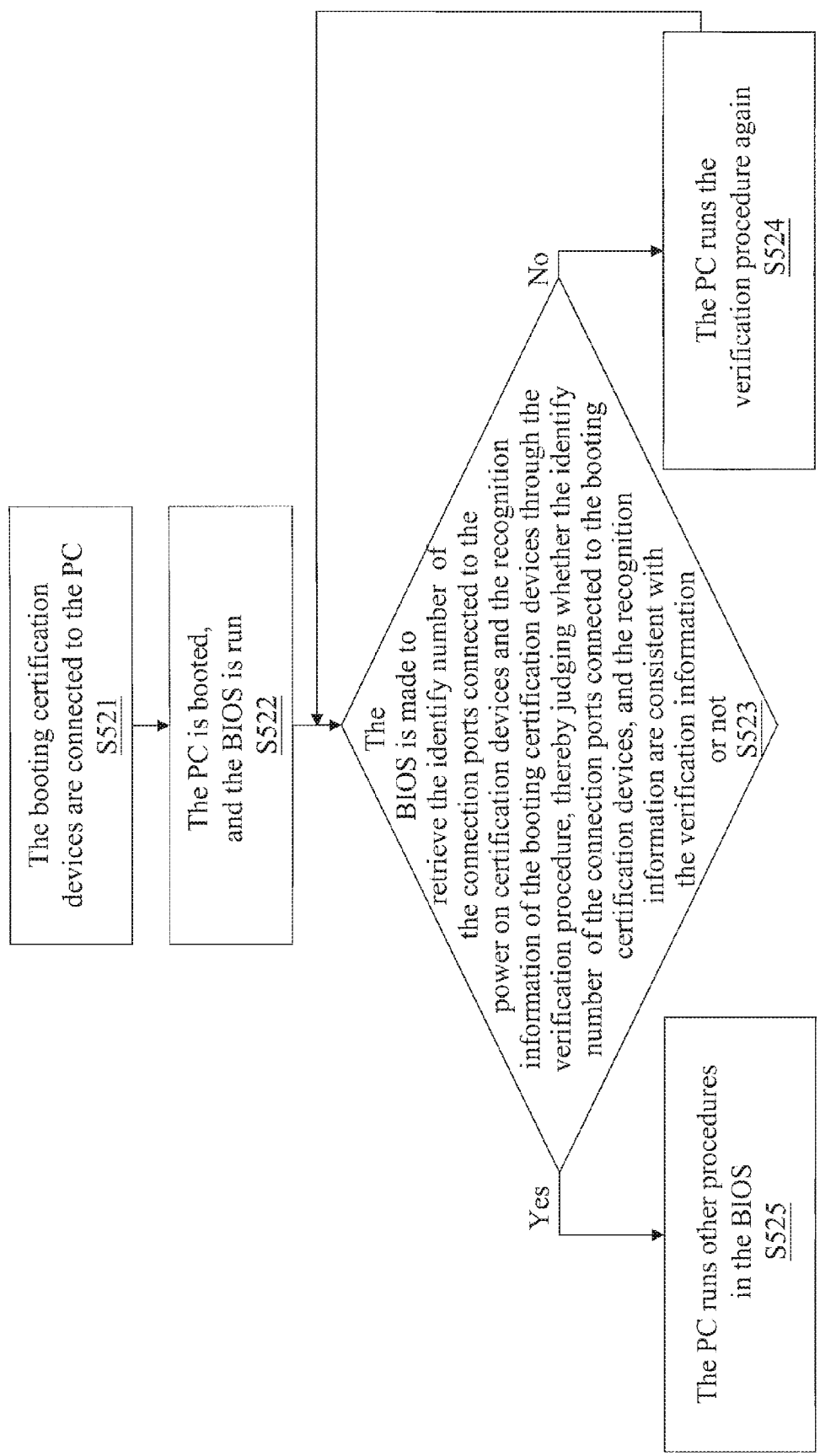
FIG. 5B is a schematic flow chart of a verification procedure according to the third embodiment of the present invention.

In addition to the above embodiments, the present invention may be further applied to a situation having a plurality of booting certification devices 110 and a plurality of connection ports 132. It is assumed that an amount of the booting certification devices 110 is equal to an amount of the connection ports 132 at the utmost. Referring to FIGS. 5A and 5B, a schematic flow chart of a process of setting verification information and a schematic flow chart of a verification procedure according to the third embodiment of the present invention are shown respectively. The process of setting the certification information according to the third embodiment of the present invention comprises the following steps.

In Step S511, the booting certification devices are connected to a PC.

In Step S512, a BIOS of the PC is run.

In Step S513, a certification information generation procedure of the BIOS is enabled.

In Step S514, recognition information retrieved from the booting certification devices and identify number of the connection ports connected to the booting certification devices are recorded as the verification information, and then the verification information is stored in the BIOS.

Steps S511-S513 in the third embodiment are the same as Steps S411-S413 in the second embodiment. In this embodiment, each booting certification device 110 records the corresponding connection port 132.

When the PC 120 begins to run, the processing unit 131 detects whether the booting certification device 110 is connected to the PC 120 or not. If the processing unit 131 detects that the booting certification device 110 is connected, the processing unit 131 reads the identify number of the booting certification device 110 connected to each connection port and the certification information of the booting certification device 110 connected to the connection port 132 in sequence.

Each connection port 132 has the corresponding identify number, and the BIOS 133 identifies connected peripheral devices 140 according to the different identify number of the connection ports 132 during the initialization. Therefore, the verification procedure 134 records the identify number of each connection port 132 connected to the booting certification device 110 in sequence, and stores the identify number of the connection ports 132 connected to the booting certification devices 110 and the corresponding certification information (corresponding to Step S513-Step S514).

After completing setting the certification information, the PC 120 enters the verification procedure 134 during a power-on stage later. Referring to FIG. 5B, the verification procedure 134 of this embodiment comprises the following steps.

In Step S521, the booting certification devices are connected to the PC.

In Step S522, the PC is booted, and the BIOS is run.

In Step S523, the BIOS is made to retrieve the identify number of the connection ports connected to the booting certification devices and the recognition information of the booting certification devices through the verification procedure, thereby judging whether the identify number of the connection ports connected to the booting certification devices, and the recognition information are consistent with the verification information or not.

In Step S524, when the combination of the recognition information and the identify number of the connection ports is different from the verification information, the PC runs the verification procedure again.

In Step S525, when the combination of the recognition information and the identify number of the connection port is consistent with the verification information, the PC runs other procedures in the BIOS.

Actions of Step S521 and Step S522 are the same as Step S411 and Step S412, so they are not repeatedly described. In Step S513, in addition to retrieving the recognition information 160 of the booting certification devices 110, the verification procedure 134 retrieves the identify number of the connection ports 132 connected to the booting certification devices 110.

The verification procedure 134 judges whether the identify number of the connection ports 132 and the recognition information 160 are consistent with the identify number of the connection ports 132 and the recognition information 160 stored in the verification information 136 or not. In other words, the verification procedure 134 compares whether the connection port 132 currently connected to the booting certification device 110 is the same as the connection port 132 during the initial setting. Briefly, when the booting certification device 110 is connected to the corresponding connection port 132, the connection is correct.

When the connection port 132 connected to the booting certification device 110 is inconsistent with the setting, or the recognition information 160 is different from the certification information, the processing unit 131 runs the verification procedure 134 again, until the booting certification device 110 is consistent with the set condition. On the contrary, when the booting certification device 110 satisfies the set condition, the PC 120 runs other procedures in the BIOS 133.

Fourth Embodiment

As compared with the third embodiment, in this embodiment, peripheral devices 140 determined to be enabled when a PC 120 is powered on are set according to different booting certification devices 110. In other words, when a user installs the different booting certification devices 110, the PC 120 starts the corresponding peripheral devices 140 after passing through a verification procedure 134.

Figure 6A:
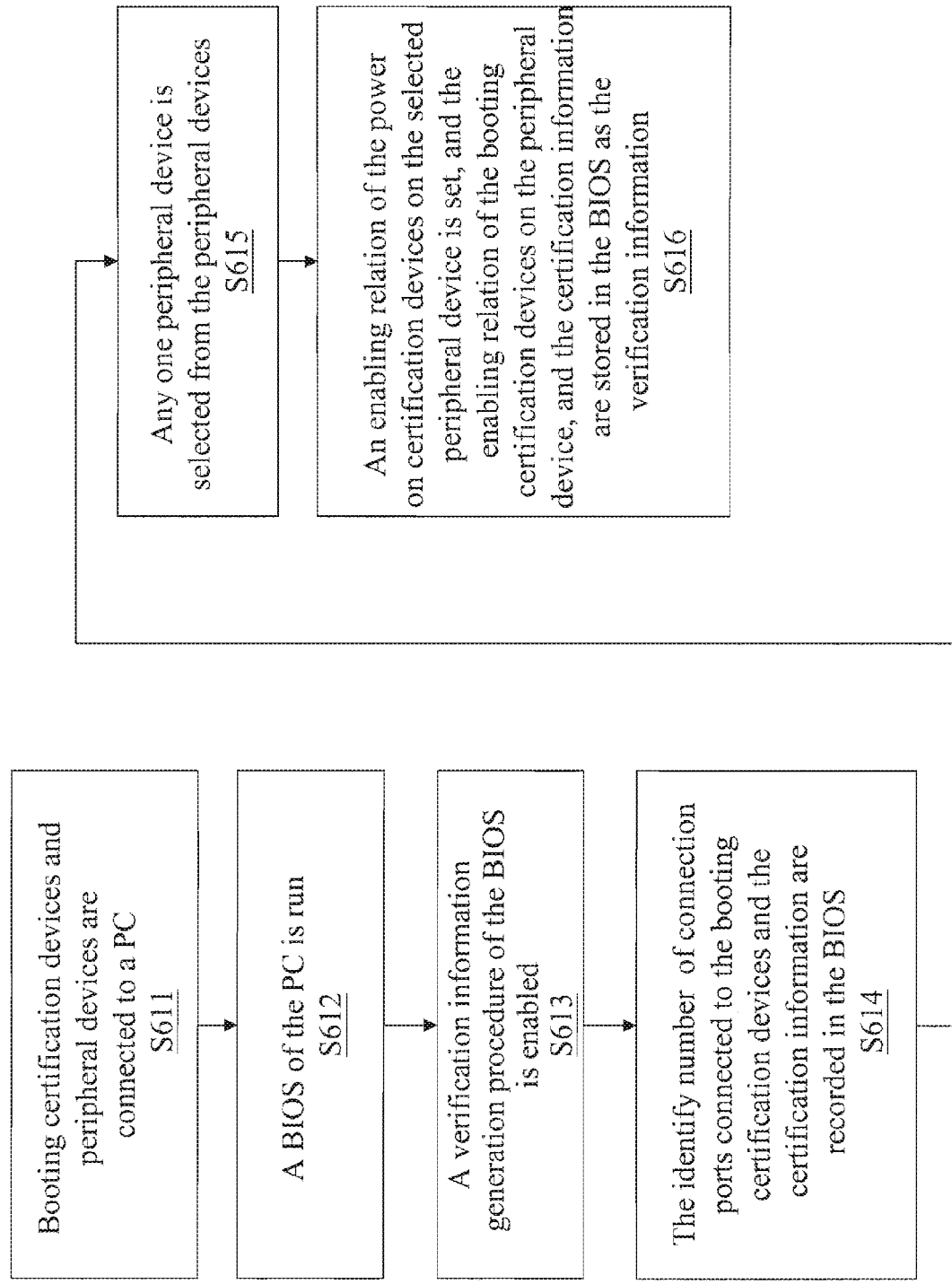
FIG. 6A is a schematic flow chart of a process of setting certification information according to a fourth embodiment of the present invention.
Figure 6B:
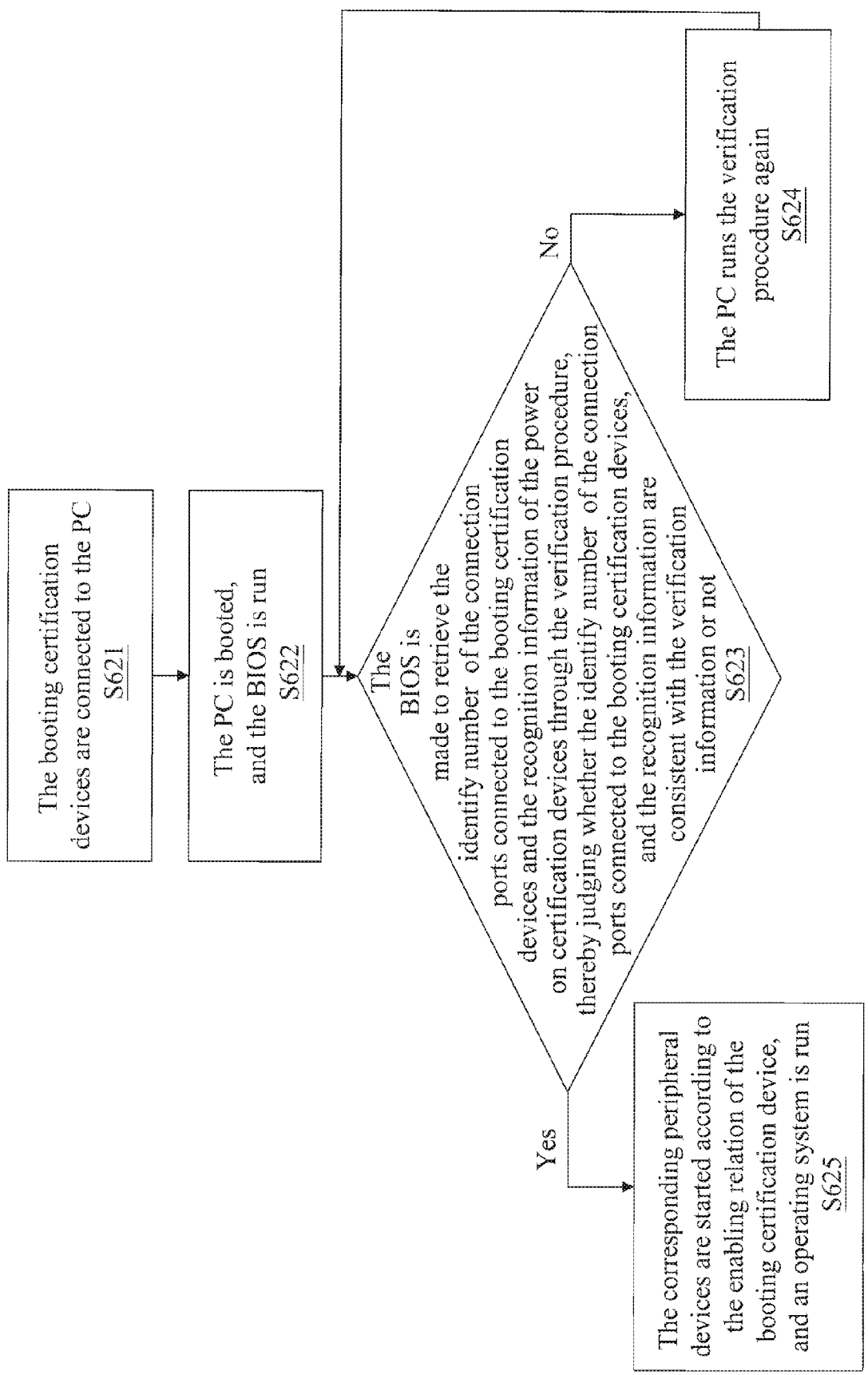
FIG. 6B is a schematic flow chart of a verification procedure according to the fourth embodiment of the present invention.

In this manner, according to the different booting certification devices 110, the different users are endowed with different usable peripheral devices 140. Referring to FIGS. 6A and 6B, a schematic flow chart of a process of setting certification information and a schematic flow chart of the verification procedure according to the fourth embodiment of the present invention are shown respectively.

The process of setting the certification information according to the embodiment comprises the following steps.

In Step S611, the booting certification devices and the peripheral devices are connected to the PC.

In Step S612, a BIOS of the PC is run.

In Step S613, a verification information generation procedure of the BIOS is enabled.

In Step S614, the identify number of connection ports connected to the booting certification devices and the certification information are recorded in the BIOS.

In Step S615, any one peripheral device is selected from the peripheral devices.

In Step S616, an enabling relation of the booting certification devices on the selected peripheral device is set, and the enabling relation of the booting certification devices on the peripheral device, and the certification information are stored in the BIOS as the verification information.

In this embodiment, before the PC 120 is powered on, the booting certification devices 110 and the peripheral devices 140 are connected to the PC 120. At least one booting certification devices 110 exists, and also at least one peripheral device 140 exists (corresponding to Step S611).

In this embodiment, the plurality of booting certification devices 110 is used, such that the connection port 132 corresponding to each booting certification device 110 must be recorded (corresponding to Step S612-Step S613). When the verification information 136 generation procedure 135 is run, the verification information generation procedure 135 receives the certification information of the booting certification devices 110, and records the identify number of the connection ports 132 connected to the booting certification devices 110.

Next, the enabling relation on the corresponding peripheral devices 140 is set for each booting certification device 110. The enabling relation in the present invention is whether to determine to enable the peripheral devices 140 or not. Each booting certification device 110 may be set to start the corresponding peripheral devices 140 after passing through the certification. The booting certification device 110 may set the enabling relation on at least one corresponding peripheral device 140.

After completing setting the certification information, the running of the verification procedure 134 is described. Referring to FIG. 6B, the verification procedure 134 according to the fourth embodiment comprises the following steps.

In Step S621, the booting certification devices are connected to the PC.

In Step S622, the PC is booted, and the BIOS is run.

In Step S623, the BIOS is made to retrieve the identify number of the connection ports connected to the booting certification devices and the recognition information of the booting certification devices through the verification procedure, thereby judging whether the identify number of the connection ports connected to the booting certification devices, and the recognition information are consistent with the verification information or not.

In Step S624, when the recognition information or the identify number of the connection ports is different from the verification information, the PC runs the verification procedure again.

In Step S625, when the recognition information or the identify number of the connection ports is consistent with the verification information, the corresponding peripheral devices are started according to the enabling relation of the booting certification device 110, and an operating system is run.

Firstly, the booting certification devices 110 are connected to the PC 120, and the PC 120 is run (corresponding to Step S621-Step S622). Next, the processing unit 131 runs the BIOS 133. The verification procedure 134 is embedded in the BIOS 133, so the processing unit 131 also runs the verification procedure 134. The verification procedure 134 is used to retrieve the identify number of the connection ports 132 connected to the booting certification devices 110 and the recognition information 160 of the booting certification devices 110. The verification procedure 134 compares the retrieved information with the verification information 136 (corresponding to Step S6230).

Each booting certification device 110 is corresponding to a different peripheral device 140, such that when the different booting certification devices 110 are connected, the corresponding peripheral devices 140 may be started. The BIOS 133 may initialize hardware resources of various peripheral devices 140, and thus in the present invention, it is determined whether to initialize the peripheral devices 140 or not through the enabling relation. Once the peripheral devices 140 are not initialized when the BIOS 133 is operated, the operating system cannot correctly drive the peripheral devices 140. In this manner, the user is enabled to use the corresponding hardware devices. In a variation of this embodiment, the resources of the peripheral devices 140 are initialized by using permutation and combination of the plurality of booting certification devices 110.

Figure 6C:
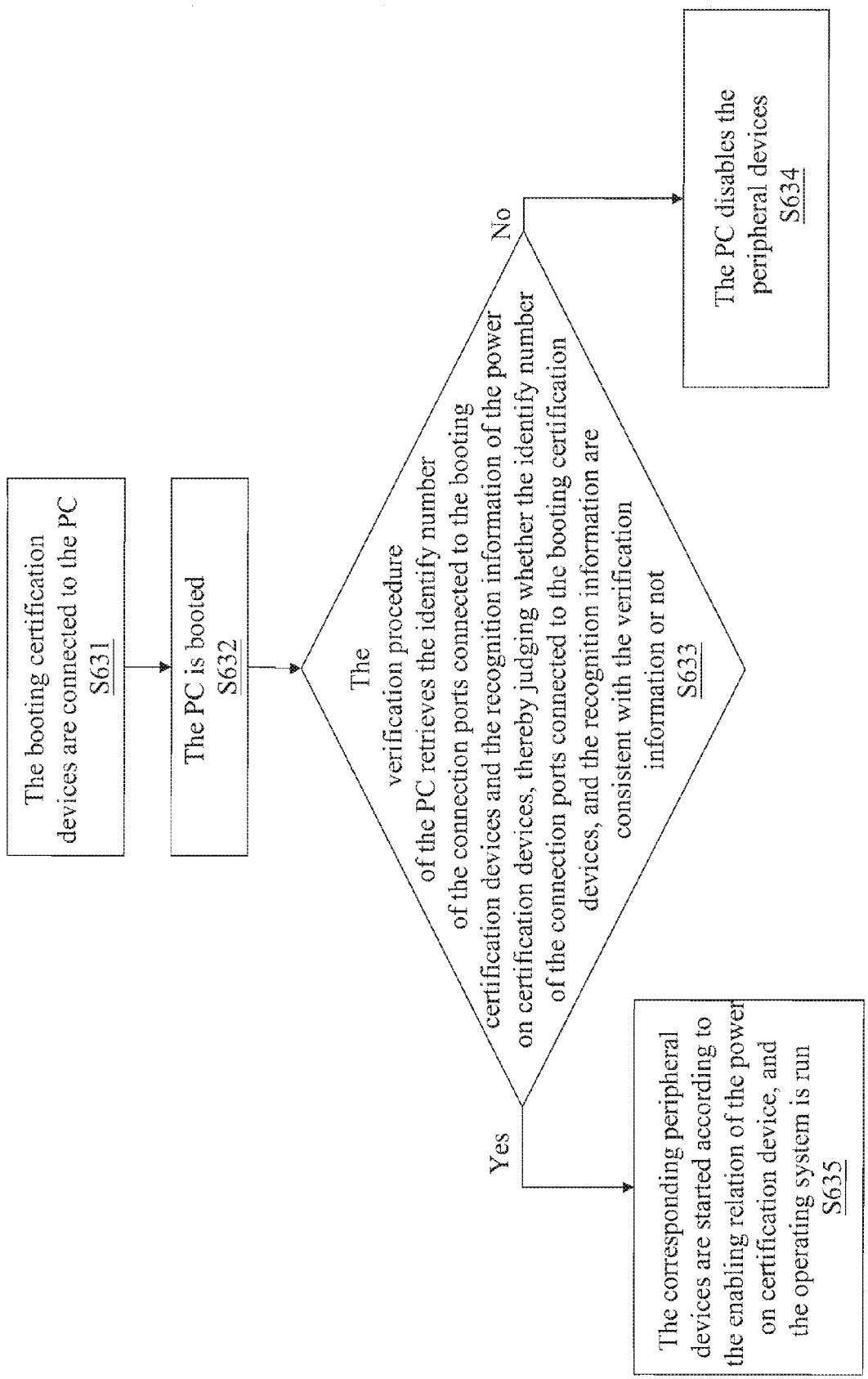
FIG. 6C is a schematic flow chart of another verification procedure according to the fourth embodiment of the present invention.

In addition to the above manner, the verification procedure according to the third embodiment may also have the following variation. Referring to FIG. 6C, the procedure comprises the following steps.

In Step S631, the booting certification devices are connected to the PC.

In Step S632, the PC is booted.

In Step S633, the verification procedure of the PC retrieves the identify number of the connection ports connected to the booting certification devices and the recognition information of the booting certification devices, thereby judging whether the identify number of the connection ports connected to the booting certification devices, and the recognition information are consistent with the verification information or not.

In Step S634, when the recognition information or the identify number of the connection ports is different from the verification information, the PC disables the peripheral devices.

In Step S635, when the recognition information or the identify number of the connection ports is consistent with the verification information, the corresponding peripheral devices are started according to the enabling relation of the booting certification device, and the operating system is run.

The variation is different from the embodiments that when the recognition information 160 is different from the verification information 136, the processing unit 131 still continuously runs the BIOS 133 and the operating system, but disables the peripheral devices 140.

Figure 7A:
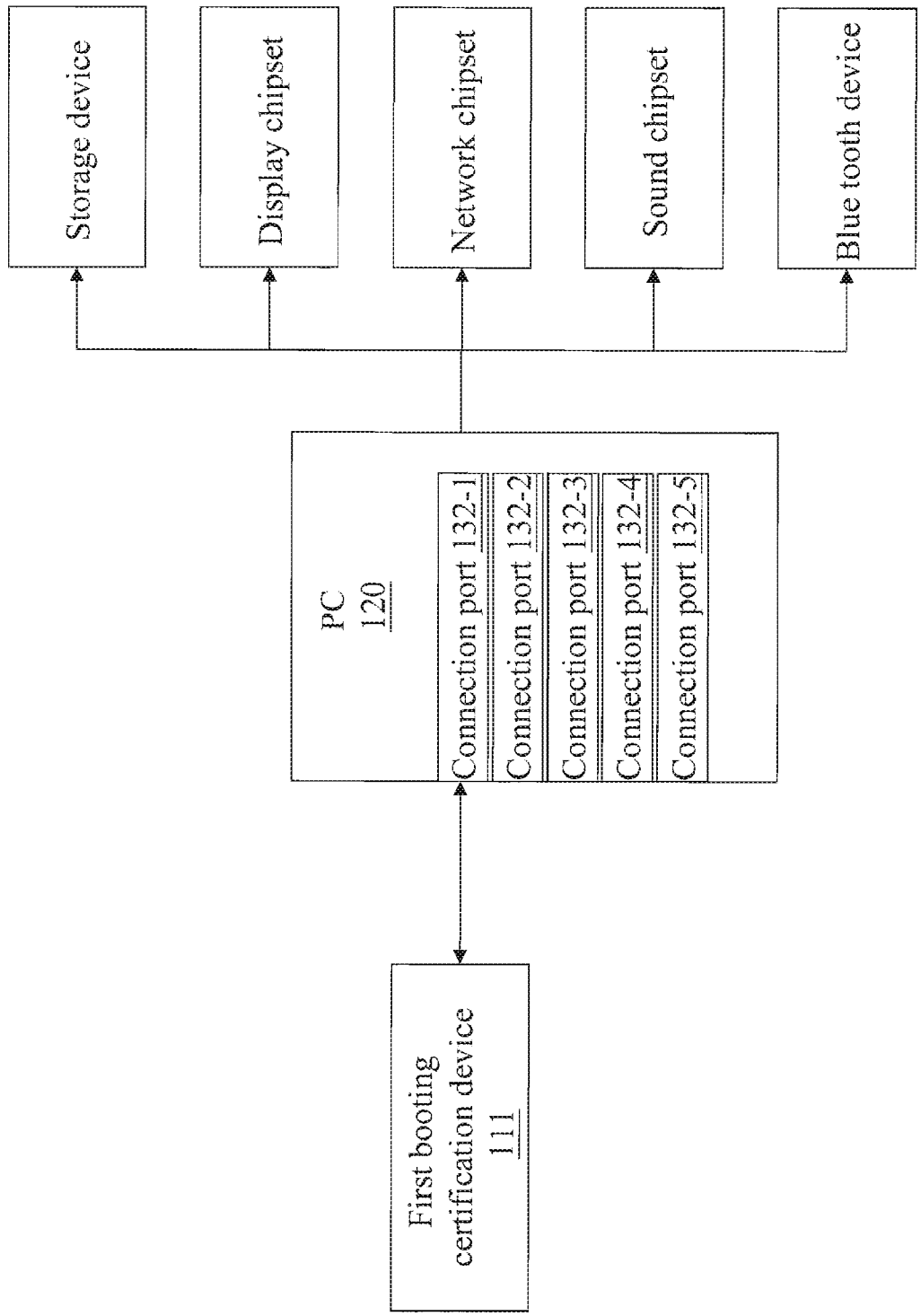
FIG. 7A is a schematic view of enabled devices corresponding to a first booting certification device according to the present invention.
Figure 7B:
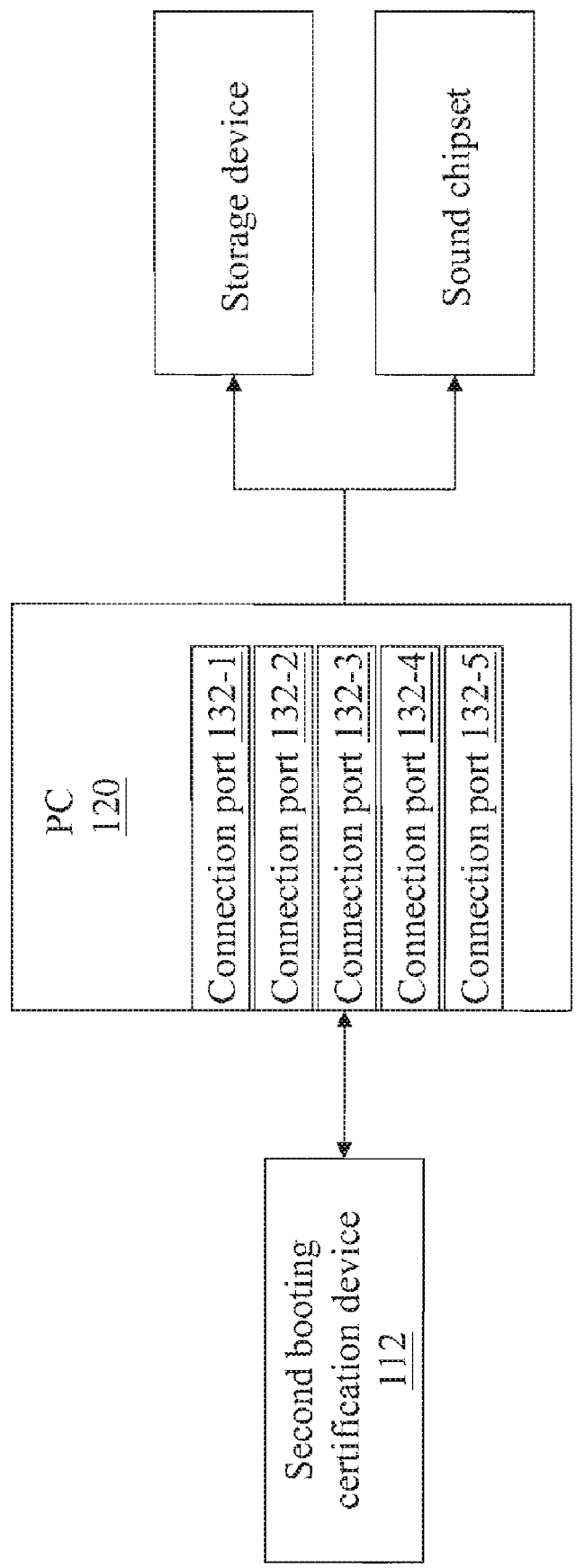
FIG. 7B is a schematic view of enabled devices corresponding to a second booting certification device according to the present invention.
Figure 7C:
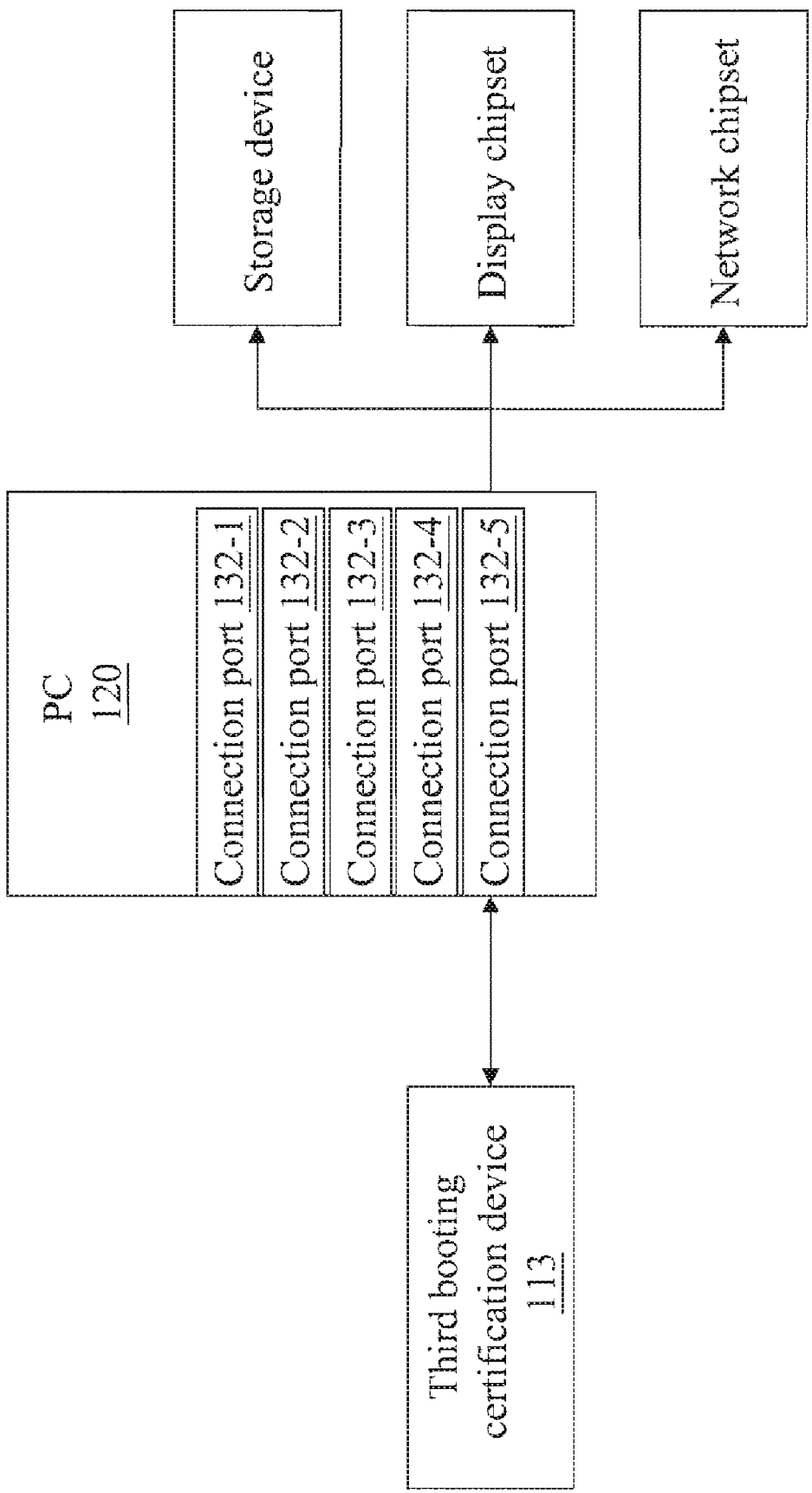
FIG. 7C is a schematic view of enabled devices corresponding to a third booting certification device according to the present invention.

In order to make the operating spirit of the present invention comprehensible, an example below is used for description. However, the amount of the booting certification devices 110 and the relevant peripheral devices 140 are not limited. Referring to FIGS. 7A-7C, schematic views of enabled devices corresponding to the booting certification devices according to the present invention are shown respectively.

It is assumed that a first booting certification device 111, a second booting certification device 112, and a third booting certification device 113 exist. The first booting certification device 111 enables a storage device, a display chipset, a network chipset, a sound chipset, and a blue tooth device connected to the PC 120. The second booting certification device 112 enables the storage device and the sound chipset. The third booting certification device 113 enables the storage device, the display chipset, and the network chipset. The PC 120 has connection ports 132-1, 132-2, 132-3, 132-4, and 132-5. The first booting certification device 111 is corresponding to the connection port 132-1 having the number 1, the second booting certification device 112 is corresponding to the connection port 132-3 having the number 3, and the third booting certification device 113 is corresponding to the connection port 132-5 having the number 5.

Figure 7D:
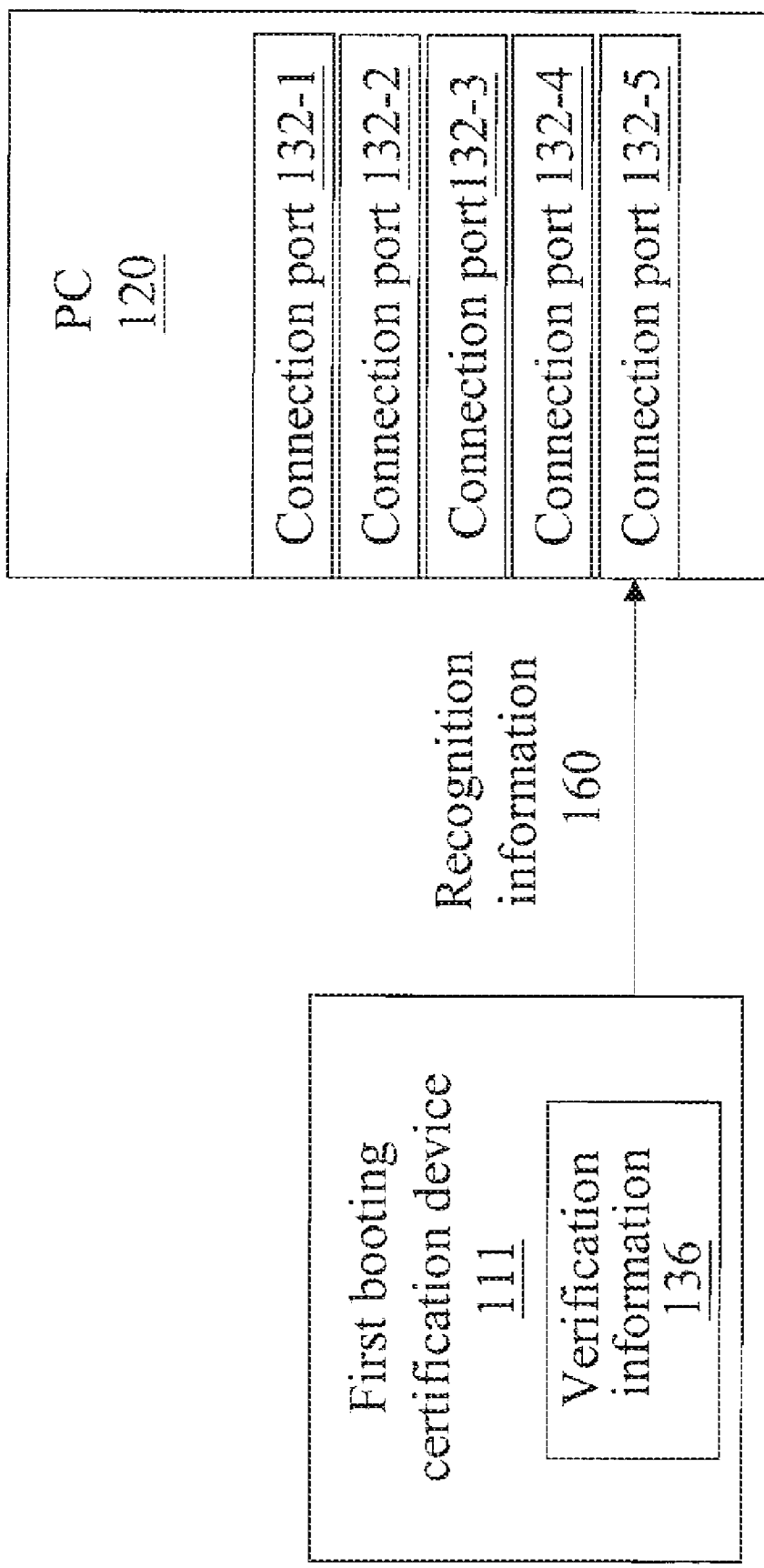
FIG. 7D is a schematic view of the first booting certification device performing verification according to the present invention.

When the user connects the first booting certification device 111 to the connection port 132-5 having the number 5 (as shown in FIG. 7D), the verification procedure 134 retrieves the recognition information 160 of the first booting certification device 111 through the connection port 132-5 having the number 5 during running. The first booting certification device 111 is not connected to the connection port 132-1 having the number 1, thus resulting in the problem that the verification information 136 is inconsistent with the recognition information 160. Therefore, the PC 120 runs the verification procedure 134 again, until the user connects the first booting certification device 111 to the connection port 132-1 having the number 1. Further, after the power-on stage, the PC 120 may only drive the storage device, the display chipset, the network chipset, the sound chipset, and the blue tooth device. In this manner, after the PC 120 enters the operating system, the operating system can only use the driven peripheral devices. The operating system cannot acquire other peripheral devices 140 being not driven through the BIOS 133, thus achieving the efficacy of disabling the specific peripheral devices.

In the power on certification method for the PC 120 and the power on certification system 100 thereof provided in the present invention, the certification device is connected to the PC 120, and the PC performs the verification procedure during the power-on stage according to the certification information of the certification device. The users need not to input passwords, and the security of the BIOS 133 is ensured. Further, the peripheral devices 140 capable of being used by each user may be determined. In the present invention, mainly the BIOS 133 is protected, so the malicious user cannot randomly alter any device in the PC 120. In this manner, the problem of the prior art that only the operating system is protected is avoided.

What is claimed is:

1. A power on certification method for a personal computer (PC), comprising:
   connecting a booting certification device to a PC;
   booting the PC, and running a basic input output system (BIOS);
   making the BIOS retrieve recognition information of the booting certification device through a verification procedure, so as to judge whether the recognition information is consistent with verification information stored in the PC or not;
   when the recognition information is consistent with the verification information, acquiring an identify number of connection ports connected to the booting certification device, comparing a number recorded in the BIOS with the identify number of the connection ports connected to the booting certification device, enabling a plurality of peripheral devices b the verification procedure when the identify number of the connection ports connected to the booting certification device is consistent with the number recorded in the BIOS, and disabling the plurality of peripheral devices by the verification procedure when the identify number of the connection ports connected to the booting certification device is different from the number recorded in the BIOS;
   running the verification procedure again by the PC, when the recognition information is different from the verification information; and
   continuously running the BIOS by the PC, when the recognition information is consistent with the verification information.

2. The power on certification method for the PC according to claim 1, wherein after the step of retrieving the recognition information of the booting certification device, the method further comprises performing a one way function procedure on the recognition information, so as to generate encrypted recognition information.

3. A power on certification system for a personal computer (PC), comprising:
   at least one booting certification device, having a connection interface and recognition information; and
   a PC, comprising a connection port corresponding to the connection interface, a verification procedure, at least one piece of verification information, and a plurality of peripheral devices, wherein the PC is electrically connected to the booting certification device through the connection port, the PC calls the verification procedure when running a basic input/output system (BIOS), and the verification procedure retrieves the recognition information and judges whether the recognition information is consistent with the verification information or not
   wherein when the recognition information is consistent with the verification information, the verification procedure acquires an identify number of connection ports connected to the booting certification device, compares a number recorded in the BIOS with the identify number of the connection ports connected to the booting certification device, enables a plurality of peripheral devices when the identify number of the connection ports connected to the booting certification device is consistent with the number recorded in the BIOS, and disables the plurality of peripheral devices when the identify number of the connection ports connected to the booting certification device is different from the number recorded in the BIOS.

4. The power on certification system for the PC according to claim 3, wherein each piece of verification information is respectively corresponding to the booting certification device.

5. The power on certification system for the PC according to claim 3, wherein the BIOS has an one way function procedure, encrypted recognition information is generated after the recognition information passes through the one way function procedure, and the verification procedure compares the encrypted recognition information with the verification information.

6. The power on certification system for the PC according to claim 3, wherein the connection interface is a universal serial bus (USB).

7. The power on certification system for the PC according to claim 3, wherein the booting certification device further has a control chip having the recognition information.

8. The power on certification system for the PC according to claim 3, wherein the peripheral devices comprise a main board, a display chipset, a sound chipset, a network chipset, a peripheral controller interface (PCI) bus, an integrated device electronics (IDE) bus, a serial advanced technology attachment (SATA) bus, a 1394 bus, a USB bus, a keyboard controller, a recommended standard (RS)-232 communication port, or a line print terminal (LPT) communication port.

* * * * *